United States Patent Office 3,534,104
Patented Oct. 13, 1970

3,534,104
SECONDARY PHOSPHINE SELENIDES
AND PROCESS FOR PREPARING
Ludwig Maier, Zurich, Switzerland, assignor to Monsanto Company, St. Louis, Mo., a corporation of Delaware
No Drawing. Continuation of application Ser. No. 694,364, Dec. 29, 1967, which is a continuation-in-part of application Ser. No. 522,410, Jan. 24, 1966. This application Mar. 6, 1969, Ser. No. 806,038
Claims priority, application Switzerland, Jan. 27, 1965, 1,160/65; Jan. 5, 1967, 324/67
Int. Cl. C07f 9/28
U.S. Cl. 260—606.5        19 Claims

ABSTRACT OF THE DISCLOSURE

Secondary phosphine selenides of the formulae $$R^1R^2P(Se)H$$

and $R^1(H)P(Se)—(Se)P(H)R^2$ and process for preparing by reacting a secondary phosphine with selenium or reacting an aminophosphine with hydrogen selenide to split off amine. The secondary phosphine selenides release elemental selenium from their solution in the presence of oxygen which selenium is useful as a catalyst for oxidations and hydrogenations.

---

This application is a continuation of application Ser. No. 694,364, filed Dec. 29, 1967, which in turn was a continuation-in-part of application Ser. No. 522,410, filed Jan. 24, 1966, both now abandoned.

Secondary phosphine selenides of the formulae $$R^1R^2PH \text{ or } R^1(H)P(Se)—(Se)P(H)R$$
$$\parallel$$
$$Se$$

wherein $R^1$ and $R^2$, when taken singly, signify identical or different alkyls, alkenyls, alkynyls, cycloalkyls, cycloalkenyls, alkaryls, alkenylaryls, alkynylaryls, aryls, aralkyls, aralkenyls, aralkynyls, or heterocyclic groups having up to 20 carbon atoms, and when taken together, a polymethylene ring having 3 to 7 methylene units joined by the phosphorus atom, have not previously been known. Especially desirable compounds are those wherein $R^1$ and $R^2$ are each hydrocarbyl having up to 20 carbon atoms, and for some uses more preferably not more than 8 carbon atoms.

It has been found that these compounds are obtained in quantitative yield by reaction of secondary phosphines with selenium according to the equations $$R^1R^2PH+Se \rightarrow R^1R^2P(Se)H$$

or $$R^1(H)P—P(H)R^2+2Se \rightarrow R^1(H)P(Se)—(Se)P(H)R^2$$

Primary phosphines are not capable of this reaction.

The secondary phosphines serving as starting compounds are well known. In principle, any secondary phosphine showing at least one grouping >P—H can be used.

Examples of organic groups $R^1$ and $R^2$ are: Alkyls, alkenyls, and alkynyls such as methyl, ethyl, vinyl, ethynyl, n-propyl, iso-propyl, allyl, propenyl, iso-propenyl, propargyl, propynyl, n-butyl, iso-butyl, tert-butyl, methallyl, 1-butenyl, crotyl, 3-butenyl, butadienyl, 1-butynyl, 2-butynyl, 3-butynyl, 1-butene-2-ynyl and higher aliphatic rests having up to 20 carbon atoms such as undecenyl, dodecyl, myristyl, oleyl, tetracosyl; moreover cycloalkyls and cycloalkenyls such as cyclopentyl, cyclopentenyl, cyclopentadienyl, cyclohexyl, cyclohexenyl, cyclohexadienyl and higher alicyclic groups having up to 12 carbon atoms such as cyclooctyl, cyclooctatrienyl, cyclododecyl, cyclododecatrienyl, bicyclohexyl; moreover aralkyls, aralkenyls and aralkynyls such as benzyl, cuminyl, phenylethyl, styryl, phenylethynyl, phenylpropyl, 1-phenylallyl, 2-phenylallyl, cinnamyl, phenylpropynyl, 1-phenylpropargyl, 3-phenylpropargyl, diphenylmethyl, triphenylmethyl, 1-naphthylmethyl, 2-naphthylmethyl, 1-naphthylethyl, 2-naphthylethyl, 1-naphthylethenyl, 2-naphthylethenyl, 1-naphthylethynyl, 2-naphthylethynyl; moreover alkaryls, alkenylaryls and alkynylaryls such as tolyl, xylyl, mesityl, duryl, ethylphenyl, cumyl, vinylphenyl, ethynylphenyl, propargylphenyl, propynylphenyl, tert-butylphenyl, 1-vinylnaphthyl, 2 - vinylnaphthyl, 1-ethylnylnaphthyl, 2-ethynylnaphthyl; moreover aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl; moreover heterocyclic groups such as pyrryl, furyl, benzofuryl, thienyl, pyrrolinyl, pyrazolyl, pyrazolinyl, imidazolyl, thiazolyl, oxazolyl, isooxazolyl, pyrazinyl, pyrimidyl, pyridzainyl, pyridyl, pyranyl, thiopyranyl, piperidyl, morpholinyl, thiazinyl, triazinyl, quinolyl, quinazolyl, quinoxalyl, indolyl, carbazolyl, etc.

Some of the simplest representatives are dimethylphosphine, diphenylphosphine, methyl-phenylphosphine and phosphacyclohexane. There are also included the biphosphines of the types $H(R^1)P—P(R^1)H$, $$H(R^1)P\text{-alkylene-}P(R^1)H$$

and $H(R^1)P\text{-arylene-}P(R^1)H$.

The selenium to be used as a further reactant can occur in optional modification such as amorphous, metallic, α-monocline, β-monocline and cubic.

On practising the invention the reactants, preferably using at least about a stoichiometric ratio, are reacted, usually heated, in an inert solvent until the theoretical amount of selenium has been dissolved. The finely comminuted selenium may also be used in excess quantity. Heating is desirable in most cases at least after the initial exothermic reaction is finished to complete the reaction to high yields in a short reaction time. The reaction proceeds exothermally and thus, larger and more concentrated batches have to be cooled. Benzene, as an example, is very well suited as a solvent. According to the concentration of the batch and the particular phosphine being reacted, the addition of the selenium at 70–80° C. is complete within about 5 to 30 minutes. Moisture and oxygen should be excluded from the reaction mixture. One can use for this purpose a blanketing gas like nitrogen, helium and argon.

The crude secondary phosphine selenide formed quantitatively is, as a rule, rather pure. It may be purified further by crystallization.

These secondary phosphine selenides can also be obtained by reacting an aminophosphine of the formulae with $R^1R^2PNR'_2$ or $R^1(R'_2N)P—P(NR'_2)R^2$ in which $R^1$ and $R^2$ are the same as described above and $NR'_2$ represents an amino group, with hydrogen selenide according to the equation, $$R^1R^2PR'_2+2H_2Se \rightarrow R^1R^2P(Se)H+R'_2NH \cdot H_2Se$$

The preparation of the aminophosphines, e.g. by reaction of aminochlorophosphines with Grignard compounds, organolithium compounds or organoaluminum compounds, or by aminolysis of organic chlorophosphines is known [L. Maier, Helv. Chim Acta, 47, 2129 (1964)]. The kind of R groups which occur in the last mentioned process depends, for an example, on the available organic chlorophosphines, of which numerous representatives have been described in the technical literature.

The $R'_2N$ group has only an auxiliary function, because it is split off during the reaction. The choice of the amino group therefore is directed by the ease of preparation of the starting compound and possibly also by the ability of recovery of the amine from the aminohydroselenide made as a by-product. The NH$_2$ group occurs, as a rule, only in phosphines having strong electron-withdrawing substituents such as in (C$_6$F$_5$)$_2$PNH$_2$ and (CF$_3$)$_2$PNH$_2$. The reaction of halophosphines with ammonia or primary amines leads, as is known, easily to further substitution in the amino group. The resulting compounds such as e.g.

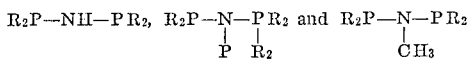

are suitable as well in the present process as starting compounds. In such a case the reaction of the invention proceeds, e.g. according to the equation

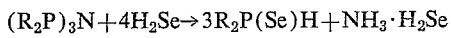

and hydrogen selenide, which is uselessly consumed for the neutralization of the ammonia or amine split off, can be saved.

Thus, the amino group can be, e.g., NH$_2$ methylamino, dimethylamino, n-propylamino, iso-propylamino, cyclohexylamino, piperidino, anilino or methylanilino. Of course, the phosphorus derivatives such as

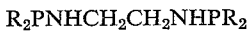
and
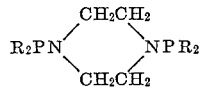

derived from a bivalent or multivalent amine, can be reacted in the same manner.

The bis-aminophosphines serving as starting compounds can be obtained from amino-organo-halophosphines on treating with a sodium-potassium alloy in ether at −10 to −20° C. [W. Seidel and K. Issleib, Z. anorg. allgem. Chem., 325, 113 (1963)].

The amino-organo-halophosphines can generally be obtained on reacting organodihalophosphines with secondary amines. There are also known numerous organodihalophosphines.

On practising this reaction of invention one introduces hydrogen selenide into, e.g., a solution of the aminophosphine for so much time, until no more essential absorption of hydrogen selenide or separation of aminohydrogen selenide takes place. As an example, hydrocarbons such as petroleum ether and benzene are suitable inert solvents. The reaction can, however, also be carried out without a solvent, if the starting compounds are liquid at the reaction temperature. Generally the absorption of the hydrogen selenide proceeds very easily and exothermically at room temperature. If necessary, the reaction temperature can be increased up to about 100° C. One works suitably under exclusion of moisture and oxygen. The amino-hydrogen selenide which is made as by-product, can, as a rule, be filtered off and the end product can be purified by distillation or crystallization.

From the P$^{31}$-NMR spectrum is evident that the novel compounds possess the above formulated seleno structure and not the selenol structure R$^1$R$^2$P—SeH. They can be used as pharmaceuticals and biocides. Contrary to the well-known tertiary phosphine selenides, the secondary phosphine selenides release gradually elemental selenium from their solution in the presence of oxygen.

Therefore, one can obtain in this manner finely comminuted selenium, or coloidal selenium, respectively, which is useful as a catalyst for oxidations and hydrogenations, for the preparation of selenium nutrient mediums to differentiate bacteria, and for many other purposes where finely divided selenium plans an important role.

EXAMPLE 1

To a suspension of 5.3 g. (0.067 mole) of red selenium in 50 ml. of benzene are added 12.5 g. (0.067 mole) of diphenylphosphine. The reaction is exothermic. After heating at 70° C. for 10 minutes one obtains a yellow solution containing traces of red selenium. These are filtered off and the benzene distilled in vacuum. One obtains in quantitative yield diphenylphosphine selenide; M.P. 99–103° C. After the recrystallization in acetonitrile the product melts at 111–112° C.

Analysis.—Calc'd for C$_{12}$H$_{11}$PSe: C, 54.52%; H, 3.82%; Se, 28.89%. Found: C, 54.36%; H, 4.46%; Se, 29.16%.

P$^{31}$ chemical shift (in benzene, 85% H$_3$PO$_4$ as a reference) −15.1 and +3.5 p.p.m., intensity 1–1.

EXAMPLE 2

To a suspension of 1.6 g. (0.02 mole) of red selenium in 10 ml. of benzene are added 3 g. (0.02 mole) of diisobutylphosphine. The reaction is strongly exothermic and the benzene starts boiling. After distilling off the benzene under reduced pressure one obtains in quantative yield di-iso-butylphosphine selenide; M.P. 75–77° C. After recrystallization in light petroleum (B.P. 40° C.) the product melts at 77–78° C.

EXAMPLE 3

H$_2$Se is introduced in a solution of 42.4 g. (0.2 mol) of diethylamino-di-n-butylphosphine in 100 ml. of benzene. The selenium hydride or hydrogen selenide is made, e.g., from Al$_2$Se and water. The aminohydroselenide precipitates after a short time. The end of reaction is recognizable by observation of the hydrogen selenide which is escaping. The diethylaminohydroselenide is filtered off and the filtrate is fractionally distilled. There are obtained besides 16.2 g. of fore-run (B.P. 50–110°/0.55 mm.), 15.5 g. (59%) of di-n-butylphosphine selenide; B.P. 116° C./0.55 mm.

EXAMPLE 4

Selenium hydride is introduced into 7.2 g. of diethylamino-diphenylphosphine as long as it is absorbed. The solution warms and turbidity appears. Now there are added 150 ml. of benzene whereby the amino hydroselenide precipitates, is filtered off and the solution is concentrated by evaporation. The residue is recrystallized from acetonitrile. Yield 5.2 g. (69.8%) of diphenylphosphine selenide; M.P. 111–114° C.

Analysis.—Calc'd for C$_{12}$H$_{11}$PSe (264.11): C, 54.52%; H, 3.82%; Se, 28.89%. Found: C, 54.3%; H, 4.3%; Se, 29.16%.

The embodiments of the invention in which an exclusive property or privilege is claimed are defined as follows:

1. A process for preparing secondary phosphine selenides of the formulae

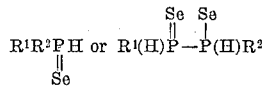

wherein R$^1$ and R$^2$, when taken singly, signify identical or different hydrocarbyl groups having up to 20 carbon atoms, comprising reacting a secondary phosphine of the general formula

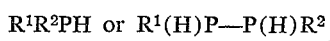

wherein R$^1$ and R$^2$ are defined as above, with selenium in an inert solvent at a temperature of not more than 100° C.

2. A process of claim 1 wherein at least about a stoichiometric amount of selenium is used, and the reactants are heated until a stoichiometric amount of selenium has been dissolved.

3. A process of claim 2 wherein R$^1$ and R$^2$ are phenyl, and red selenium is the selenium used.

4. A process of claim 2 wherein R$^1$ and R$^2$ are isobutyl, and red selenium is the selenium used.

5. A secondary phosphine selenide of the formula $R^1R^2P(Se)H$ or $R^1(H)P(Se)—(Se)P(H)R^2$ wherein $R^1$ and $R^2$, when taken singly, signify identical or different hydrocarbyl groups having up to 20 carbon atoms.

6. A phosphine selenide of claim 5 wherein $R^1$ and $R^2$ each have not more than 8 carbon atoms.

7. A phosphine selenide of claim 5 wherein $R^1$ and $R^2$ are each alkyl having not more than 8 carbon atoms.

8. A phosphine selenide of claim 5 wherein $R^1$ and $R^2$ are each aromatic having not more than 8 carbon atoms.

9. A phosphine selenide of claim 5, of the first formula wherein $R^1$ and $R^2$ are phenyl.

10. A phosphine selenide of claim 5, of the first formula wherein $R^1$ and $R^2$ are iso-butyl.

11. A phosphine selenide of claim 5 of the first fromula wherein $R^1$ and $R^2$ are n-butyl.

12. A process for preparing secondary selenides of the formulae $$R^1R^2P(Se)H \text{ or } R^1(H)P(Se)—(Se)P(H)R^2$$

in which $R^1$ and $R^2$ signify a hydrocarbon group comprising reacting an aminophosphine of the formulae $$R^1R^2PNR'_2 \text{ or } R^1(R'_2N)P—P(NR'_2)R^2$$

in which $R^1$ and $R^2$ have the same significance as above and $NR'_2$ represents an amino group with selenium hydride.

13. A process of claim 12 wherein an inert organic solvent is used for the reaction.

14. A process of claim 12 wherein $R^1$ and $R^2$ are n-butyl and $R'$ is ethyl.

15. A process of claim 12 wherein $R^1$ and $R^2$ are phenyl and $R'$ is ethyl.

16. A process of claim 12 wherein $R'$ is alkyl having not more than 8 carbon atoms.

17. A process of claim 16 wherein $R^1$ and $R^2$ each have not more than 8 carbon atoms.

18. A process of claim 16 wherein $R^1$ and $R^2$ are each alkyl having not more than 8 carbon atoms.

19. A process of claim 16 wherein $R^1$ and $R^2$ are each aromatic having not more than 8 carbon atoms.

References Cited

UNITED STATES PATENTS

| | | | |
|---|---|---|---|
| 2,953,596 | 9/1960 | Rauhut et al. | 260—606.5 X |
| 3,086,056 | 4/1963 | Wagner | 260—606.5 |
| 3,126,416 | 3/1964 | Willans | 260—60.5 |
| 3,145,234 | 8/1964 | Buckler et al. | 260—606.5 |

OTHER REFERENCES

Houben-Weyl: Methoden der Organischen Chemie (1963), vol. XII 1, pp. 139, 174, 212 and 602.

Grace Peters: J.A.C.S. (1960), vol. 82, p. 4751.

Zingaro et al.: J. of Chemical and Engineer Data (1963), vol. 8, pp. 226-9.

TOBIAS E. LEVOW, Primary Examiner

W. F. W. BELLAMY, Assistant Examiner

U.S. Cl. X.R.

252—431